Nov. 25, 1969  D. B. MORSE ET AL  3,480,497
METHOD OF MAKING A REINFORCED RESIN PANEL USING
A SOLUBLE COVER SHEET
Original Filed Feb. 12, 1963  2 Sheets-Sheet 1
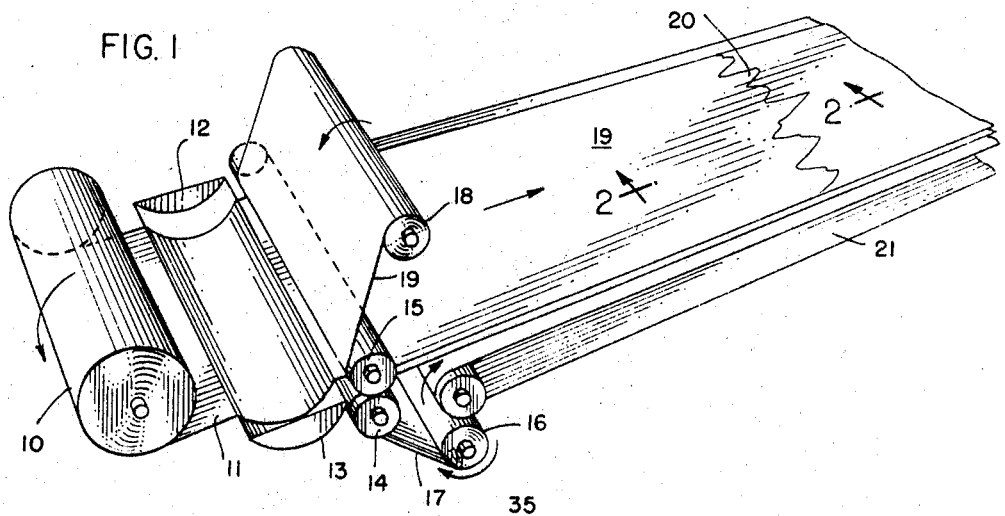
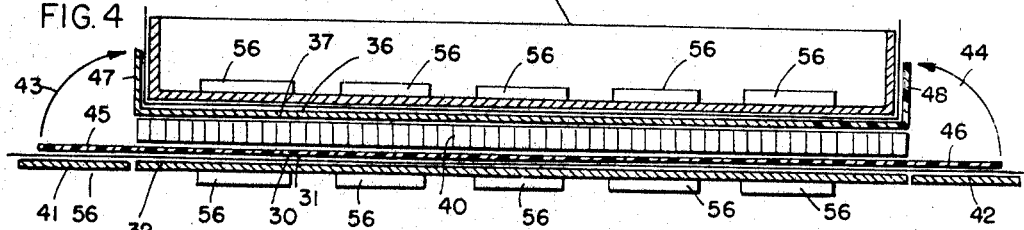
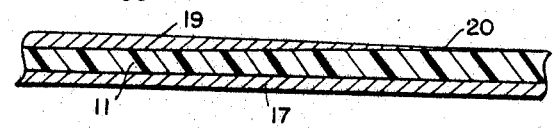
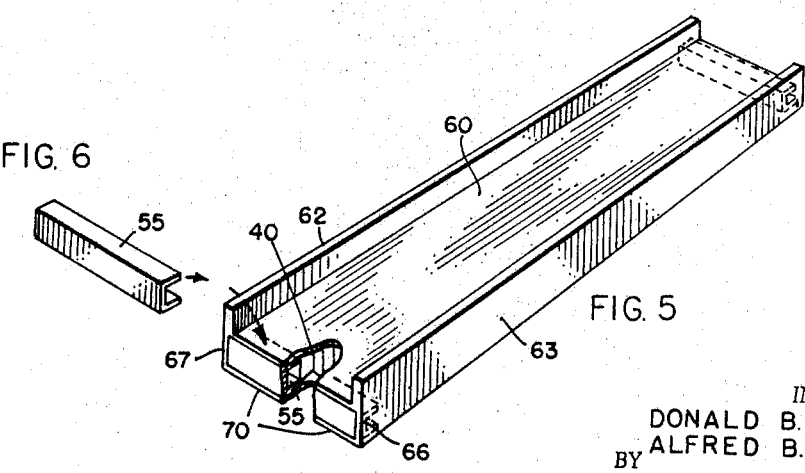
INVENTORS:
DONALD B. MORSE
ALFRED B. MENZER
BY
Carl C. Batz
ATT'Y INVENTORS:
DONALD B. MORSE
ALFRED B. MENZER
BY Carl C. Batz
ATT'Y

United States Patent Office 3,480,497
Patented Nov. 25, 1969

3,480,497
METHOD OF MAKING A REINFORCED RESIN PANEL USING A SOLUBLE COVER SHEET
Donald B. Morse and Alfred B. Menzer, Joliet, Ill., assignors to Kemlite Corporation, Joliet, Ill., a corporation of Illinois
Original application Feb. 12, 1963, Ser. No. 258,068. Divided and this application Mar. 27, 1967, Ser. No. 626,270
Int. Cl. B32b 31/12; C09j 5/02
U.S. Cl. 156—155                                    7 Claims

ABSTRACT OF THE DISCLOSURE

A method of preparing a laminate in which a fibrous sheet is impregnated with a thermosetting resin and a protective film placed over the impregnated sheet, the film being soluble in the resin, and the film and sheet then being passed between rolls before the film dissolves in the resin, and the laminate then heated to cure the resin. Also the method wherein the laminate, before curing, is pressed against the surface of a body to cause the laminate to be bonded to the body.

---

This application is a division of our application for Patent, Ser. No. 258,068, filed Feb. 12, 1963 and now abandoned.

This invention relates to panels to be used as structural units and to processes for their manufacture. More particularly, the invention relates to panels of the type known as "sandwich" panels which have a number of layers or laminations between which is a relatively light weight core. The invention relates also to processes for forming and assembling the different layers in the manufacture of such panels or in the preparation of surface coatings.

An object of the invention is to provide a panel which can be used for building such as in the construction of roofs, walls and floors. Another object is to provide such a panel which is very strong and which is also light in weight. Another object is to provide such a panel which when assembled together will make a substantially flat surface and yet will contain within itself sufficient strength to support a load over a relatively long span and without additional reinforcement.

Another object is to provide panels which are equipped with means of attachment such that the panels may be assembled in water-tight relationship and in such a way that the strength of the structure will be enhanced. Another object is to provide resin impregnated fibrous sheets suitable for assembling with other sheets or structures to form panels or coatings. Yet another object is to provide a process for making a resin impregnated fibrous sheet having a tacky surface to which the surface of other bodies may be joined. Another object is to provide a process for preparing a resin impregnated fibrous sheet which is of uniform thickness and which has a tacky surface which may be joined to other sheets or objects. Another object is to provide a process for forming resin impregnated fibrous sheets into panels which are strong but light in weight. Another object is to provide processes for the preparation of panels utilizing resin impregnated fibrous sheets which are spaced by a core of light weight material. Another object is to provide such a process which includes the enclosure of the side edges of the core and the formation of a flange by which the panels may be secured together.

Still another object is to provide apparatus for moulding and assembling the parts which make up the improved panel, and more particularly it is an object of the invention to provide a machine for forming the improved laminated structure as the sheets pass in continuous motion.

The invention is illustrated in the accompanying drawings in which:

FIG. 1 is a perspective view of apparatus for the formation of a resin impregnated fibrous sheet;

FIG. 2 is a cross sectional view taken along line 2—2 of FIG. 1 and showing the relationship of the different layers;

FIG. 3 is a cross sectional view showing the resin impregnated fibrous sheet applied to the surface of a structure;

FIG. 4 is a cross sectional view of apparatus for moulding and assembling the improved panel;

FIG. 5 is a perspective view of the finished panel with a broken sectional portion showing the interior of the panel;

FIG. 6 is a perspective view of the end piece which may be placed at the end of the core and within the resin impregnated fibrous sheets which enclose the core;

Figure 7:
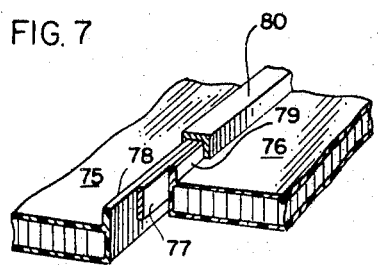
FIG. 7 is a detail perspective view partly in section showing a preferred attachment of one panel to another.

The process for preparing the resin impregnated fibrous sheets may be explained with particular reference to FIG. 1. As here illustrated, 10 represents a roll of fibrous sheet material such as fiber glass mat. Roll 10 is mounted for axial rotation, and the fibrous sheet material 11 coming from this roll is let into and through the liquid resin 12 in the trough 13, and then between the squeeze rolls 14 and 15.

Roll 16, mounted at a lower point, contains film material of a kind which will not stick to the resin after curing has taken place, such as regenerated cellulose, cellulose acetate, or treated paper. The film 17 from roll 16 is led upwardly behind and over roll 14 under and in contact with the under side of the fibrous sheet 11.

Top roll 18 contains a sheet material which is capable of dissolving in the resin in a short period of time under the conditions of the process, such, for example, as polystyrene. The film 19 coming from roll 18 is lead behind and under roll 15 in contact with the top of fibrous sheet 11.

The rolls 14 and 15 are spaced so as to squeeze the films and saturated reinforcement passing between them to a predetermined thickness with the excess resin being drained back into the trough 13. As the combination of sheets and films pass between the rollers the film 19 on top and film 17 on the bottom, protect the rollers from contact with the uncured resin, and as the films issue from the rollers 15 and 14 the resin impregnated fibrous sheet 11 continues to be protected by the film 19 on the top and the film 17 on the bottom. However, as the sheets move forwardly the top film 19 begins to dissolve in a resin ingredient of the impregnated sheet 11, and by the time the sheet has moved to the point indicated at 20 in FIGS. 1 and 2 this top film 19 has become dissolved and is thereafter indistinguishable as a film. As shown in FIG. 1 the conveyor 21 is provided to support and pass the combination of sheets forwardly as they come from the rolls 14 and 15.

The resin which is used in this operation may be any resin, but preferably a thermosetting resin, which is capable of being cured or set, including such resins as acrylic, acrylic modified polyester, polyester, or epoxy resins.

The fibrous sheet material is preferably glass fiber mat, but may also be cellulose, synthetic fibers such as nylon or rayon, or other fibrous material. In this fibrous sheet or mat the fibers may be in random arrangement or may be woven in the form of cloth. If the resin and the fibrous material are selected so as to have substantially the same light refractive qualities, the resulting resin impregnated fiber sheet will, when cured, be translucent with the individual fibers disappearing from view.

The film material for use on roll 16 may be any material which is capable of being stripped from the resin impregnated sheet after curing has taken place. Or, this material may remain adhered to the sheet and form a face of it. Typically, this material may be regenerated cellulose, cellulose acetate or treated paper. Polyester or polyvinyl fluoride film made be used to form a permanent face of the sheet.

The film material of the upper roll 18 which forms the upper face of the material which passes between the squeeze rollers, is of a material which is soluble in at least one ingredient of the resin. Polystyrene or polymethylmethacrylate is suitable for use as this top protective film. Particularly suitable combinations are polystyrene protective film when the resin is polyester which includes as a reactive diluent; polymethylmethacrylate film when the resin is polyester containing styrene and methylmethacrylate monomer; polymethylmethacrylate film when the resin contains partially polymerized methylmethacrylate monomer; and diglycidyl ether when the resin is an epoxy resin.

The dissolution of the film 19 in the resin conditions the resin impregnated structure for bonding to the surface of another body or to other layers of the same material. It then becomes sticky and will attach itself on contact with other materials. The merging of the film into the resin does not materially alter or deleteriously affect the composition of the resin or its properties. In most cases the film is closely related chemically to the resin or ingredients thereof. In preferred embodiments of the invention the top protective film contains the polymeric form of the chemical whereas the monomeric form of the same chemical is in the resin. This is true, for example, when the top film is principally polystyrene and the resin contains polymethylmethacrylate and the resin contains methylmethacrylate monomer.

In the practice of the process the fibrous material 11 from roll 10 is passed into the trough 13 through the liquid resin 12 and out again to the squeeze rolls 14 and 15. The fibrous material is saturated with the resin, and at the squeeze rolls it picks up the protective film 19 on its top side and the protective film 17 on its bottom side. These top and bottom films protect the rolls 14 and 15 from contact with the resin and thus avoid stickiness of the rolls. The squeeze rolls are set to pass a predetermined thickness and operate to squeeze out sufficient resin to make just the predetermined thickness. These rolls also squeeze out any entrained air which may be in the resin impregnated sheet.

As the laminations pass from the squeeze rolls they come to rest and move along on the conveyor 21 which is caused to move along at a predetermined speed, which may be, for example, at about 8 to 12 feet per minute.

Although the material of the film 19 is selected to be soluble in the resin, an element of time is involved until this film becomes completely dissolved, and the resin impregnated sheet moves between the squeeze rolls while the film is still strong enough to support itself and protect the rollers.

The combined sheet continues on the conveyor 21 and may be cut off in lengths as desired. These lengths or pieces may be used for making special structures such as is illustrated in FIG. 3. As here shown we have a body 25, which may be almost any structure, and may have an irregular surface 26. The piece 27, which has been cut from the continuous strip made as illustrated in FIG. 1, may be applied directly to the surface 26 with the tacky side next to that surface. The composite structure may be heated for a time to cure the resin, and the film 28 then peeled off, to leave a novel coating which is quite tough and conforms precisely with the surface of the body. The body 25 may, for example, be a card or paper with printing or a design on its surface, and when such is the case, the application of the piece 27 to the face of the card serves to give a hard and durable face. Further, when the fibers of the fibrous sheet have the same light refractive properties as the resin, as when glass fiber sheets and polyester resin is used, the printing or design is clearly visible without the appearance of any fibers.

The special resin impregnated fibrous sheets made as explained in connection with FIG. 1 are specially adapted for the manufacture of the "sandwich" panel structure of this invention. Elongated pieces of the resin impregnated fibrous material are cut from the sheets on conveyor 21. One of these pieces 30 (with its backing of cellophane or like material 31) may be placed on a table-like structure 32 which constitutes the female section of a mold (see FIG. 4) with the backing sheet next to the mold. The male section of the mold 35 may be inverted and another similar piece 36 placed on this section of the mold with the backing sheet 37 next to the mold. Then the core 40 is set in place on top of piece 30 with the bottom of the core in contact with the tacky side of the piece. Next the male section of the mold 35, with the piece 36 thereon, is turned over to bring the tacky side of piece 36 into contact with the top side of the core 40. Pressure is applied to the mold section 35 so as to bring the sheets into contact with top and bottom sides of the core. The pressure serves to embed the edges of the cellular paper core into the film to make a very firm attachment after the structure is cured.

Instead of the cellular paper core I may use any light weight material and by this I mean cellular plastic or metal, or rigid foams of urethane or polystyrene or other core material conventionally used in panel construction.

Referring again to FIG. 4 of the drawing, the female section of the mold 40 is provided at its side edges with the hinged edge pieces 41 and 42. When the male section 35 of the mold is in place as above described, these edge portions of the female section of the mold may be moved upwardly as indicated by the arrows 43 and 44, thus to bring the side edge portions 45 and 46 upwardly into contact with the side edges of the core so as to form an edge wall, and into contact also with the side edge portions 47 and 48 of piece 36. Thus the tacky side of edge portion 45 is brought into contact with the one side of the core forming an edge wall and also into contact with the tacky side of edge portion 47 of piece 36 to merge these two edge portions into a single strip or flange 50 which extends upwardly from the side edge of the structure. This flange may be seen in the finished panel shown in FIG. 5. On the other side edge of the panel is the corresponding flange 51.

The ends of the panel may be moulded in similar fashion. Suitably the female section of the mould 32 is provided also with hinged edge portions (not shown) which may be moved upwardly similarly to the action of edge portions 41 and 42 to turn the end portions of the piece 30 upwardly in contact with the ends of the core and to join the ends of pieces 30 and 36 by contacting their tacky sides together.

We have found that a somewhat stronger panel may be made by placing a rigid end rib 55, which may be a length of channel aluminum, wood, or other rigid material, at each end of the core. Then when the end portions of the piece 30 are brought upwardly as above described these end portions will enclose the adjacent rib and provide a seal about it. The rib presents flat surfaces which are contacted by the open sides of the face laminates. During cure the rib is fully bonded with the assembly.

With the sections of the mold assembled as above described, the mold and its contents may be heated for a time to cure the resin. Suitably this may be accomplished by activating the electric heaters 56 associated with each section of the mold. Pressure is maintained by the mold during the curing so that the resin sheets set without separating or breaking away from the parts with which they are assembled.

After the resin is set, the panel may be removed from the mold and the outside sheets 31 and 37 removed by stripping them from the panel. In practice it is found that the flanges 50 and 51 will be irregular at their top edges, and it is desirable to saw off the top of these flanges to a uniform height.

To summarize the steps in the preparation of the improved panel, a mat of glass or other fibrous material is drawn through a bath of liquid resin where it is impregnated with the resin. This impregnated mat or sheet then receives a protective sheet beneath its lower surface, and receives on its upper surface a sheet of material which is capable of dissolving in the resin, and so encased the resin impregnated fibrous mat is passed through squeeze rolls to squeeze out excess resin, making the sheet uniform in thickness and free of any entrapped gasses. In the course of a few minutes the upper protective sheet dissolves in the resin with which it is in contact and disappears in the resin, making the top surface open and tacky. Lengths of the sheet are cut. One length is placed on a male section of a mold with the remaining protective sheet against the mold, and another length is placed on a female section of a mold with the remaining protective sheet against the mold. A core of some light weight material such as a cellular paper structure, is placed on the upper tacky side of the female mold, and the male portion of the mold is placed in inverted position on top of the core. Then the side edge portions of the lower sheet are turned upwardly against the side edges of the core and into contact with the edges of the upper sheet. Since the edges of both sheets which come into contact are open and tacky on the sides of the sheets which come into contact, these edge portions merge together, the liquid resin of one sheet being in direct contact with the liquid resin of the other sheet. A flange is thus formed.

With the mold thus assembled, pressure is maintained so as to keep the parts properly in place, and heat is applied to cure the resin. The degree of heat and the time required for this is determined in accordance with the knowledge of the art for the particular resin which is employed.

When the resin has cured the mold is removed, the protective sheets are removed, and the flanges are trimmed to uniform height.

It is not necessary that the soluble film 19 be dissolved before the strips or pieces 30 and 36 are cut and removed from the conveyor 21 or before these pieces are placed against a surface (as in FIG. 3) or in contact with a core (as in FIG. 4), but only before the structure is subjected to curing conditions. In fact there are some advantages in delaying the dissolution so that a non tacky surface is presented during the cutting and assembling steps. It is, of course, necessary that the film does dissolve and bring the contacting parts into adhesion before the setting of the resin does take place.

It is a special feature of the improved sandwich panel that there is a resin impregnated fibrous sheet on each of the top and bottom of the core, and that the side edges of these sheets are together in a unitary sealing area, the resin being not two layers joined together but a single body. The edge portions of these sheets may be said to be "merged," and I use this term to describe the condition or result obtained when the liquid or tacky resins of the two sheets are brought together so that the resin of each may come into a unitary body before the sheets are cured and the resin becomes set. It is further a special feature of the invention that this merged portion of the edges of the sheets is in the form of a flange extending from the edges of the panel. Also it is a feature of the invention that the side portions of the sheets are turned about and in contact with the side edges of the core, and that the inside of each of the resin impregnated sheets comes into contact with the top and bottom, and also the edges of the core while the resin on the surface of the sheet is still liquid or tacky, so that after the resin is cured there is a firm fastening between the film and each point on the outside surface of the core.

The completed panels may be used for many structural purposes as in the construction of floors, roofs, and the like.

Referring now to FIG. 7, there is here shown fragments of two panels 60 and 61 similar to that which has just been described. Panel 60 is equipped with the flange 62 and panel 61 is equipped with the flange 63. Between the panels is a strip 64 which may be of aluminum or plastic or other suitable material. This strip has a principal vertical portion 65 which at its top extends between the flanges 62 and 63, and at its central portion extends between vertical edge wall 66 of the panel 61 and the vertical edge wall 67 of panel 60. At the bottom of the strip are the laterally extending flanges 68 and 69 which engage respectively the bottom section 70 of panel 60 and the bottom section 71 of panel 61.

A strip 72 of aluminum, plastic or other suitable material having a cross section of inverted U-shape, is received over the flanges 62 and 63, and a bolt or screw 73 is put through the strip 65, the flanges 62 and 63 and the portion 74 of the strip 65, to fasten the structure together, and to provide a water-tight joint between the panels.

Figure 8:
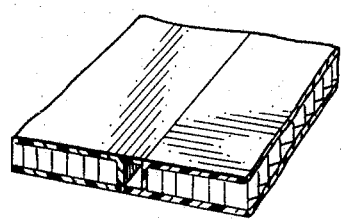
FIG. 8 is a detail perspective view partly in section showing a modified attachment between panels.

FIG. 8 shows a modified form of attachment between panels 75 and 76. In this modification a resilient strip 77, of rubber or like material, is placed between the flanges 78 and 79, and the channel strip 80 is placed over the flanges to bind them together and compress the resilient strip, thus forming a waterproof joint.

Figure 9:
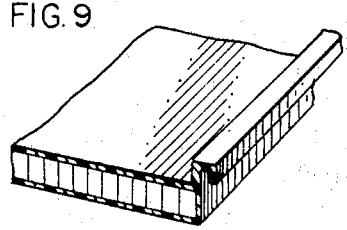
FIG. 9 is a detail perspective view partly in section showing panels arranged in modified form.

In FIGS. 5 and 7 the panels are shown as having their flanges in vertical position extending from the edge of the panel, but it is in many situations desirable that the flanges extend in other directions. For example, referring to FIG. 4, the hinged edge sections 41 and 42 of the mold may be made of somewhat thicker material, and of a width sufficient to extend when turned upwardly, only to the top of the core. In this case the flange may be extended laterally even with the top of the panel. Then the resulting panels may be placed together with alternate panels inverted, as shown in FIG. 9.

Figure 10:
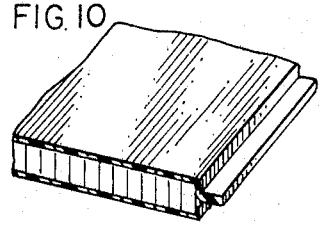
FIG. 10 is a detail perspective view partly in section showing a modified form of flange for connecting the panel to other structures.

Referring again to FIG. 4, the flange which is formed may be turned over the top edge of the hinged mold pieces 41 and 42 and downwardly on the outside of these pieces to form the hook flange structure illustrated in FIG. 10.

Figure 11:
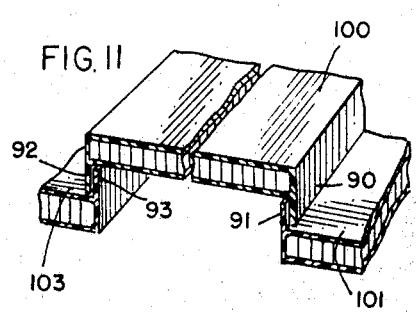
FIG. 11 is a detail perspective view partly in section showing another modified form of flange.

Or, both top and bottom sheets used in forming the sandwich structure may be turned about the edges of the core and formed into a laterally extending flange as illustrated in FIG. 11.

Figure 12:
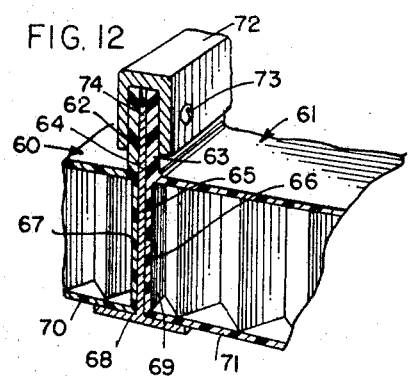
FIG. 12 is a detail perspective view partly in section showing another modified arrangement of the panels.

The form of the invention shown in FIG. 5 may itself be assembled to form a novel structure by inverting alternate panels in the assembly. As shown in FIG. 12 the flange 90 of an inverted panel 100 is placed on the inside of the flange 91 of panel 101 and the flange 92 of panel 100 is placed on the inside of the flange 93 of panel 103. The edges of the flanges 90 and 92 rest on the top of panels 101 and 103, and the flanges 91 and 93 of panels 101 and 103 are in contact with the bottom of the panel 100. Although this structure is very light in weight it has the strength which accompanies beams of relatively large cross section.

Figure 13:
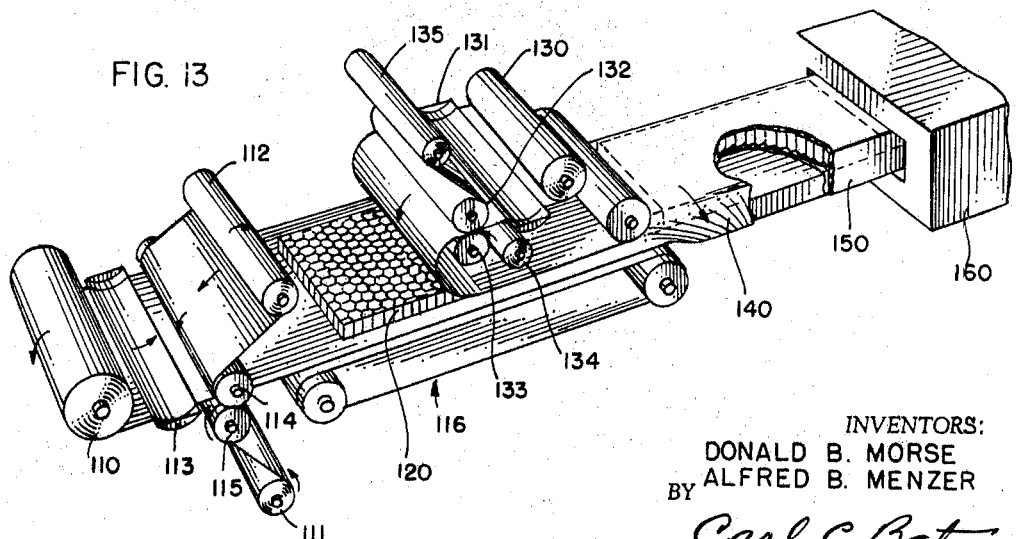
FIG. 13 is a perspective view of apparatus for making the panels in continuous fashion as the fibrous sheets move continuously along the conveyor.

FIG. 13 illustrates a machine and process for making the improved panel in a continuous manner. As here illustrated, 110 is a roll of fibrous mat, corresponding to the roll 10 of FIG. 1, and likewise the roll of regenerated cellulose or like material 111 corresponds to roll 16 of FIG. 1. And the roll 112 of film material which is soluble in the resin, corresponds to roll 18 of FIG. 1. The sheet material from roll 110 is led through the resin liquid in trough 113 and then receives a bottom protective film from roll 111 and a top protective film from roll 112, after which it passes between the squeeze rolls 114 and 114 is carried on the conveyor 116.

The core 120, which may be of cellular paper, is placed on top of the sheet material. At this point it is not necessary that the top film has yet dissolved, but it is only essential that dissolution takes place before the structure is subjected to cure.

Above the conveyor 116 is a second set of rolls. A mat of fibrous material coming from the roll 130 passes through the resin liquid in the trough 131 and approaches the squeeze rollers 132 and 133. Before passing through the squeeze rollers it picks up a bottom protective film of regenerated cellulose or other such material from the roll 134, and a top protective film 135 which is soluble in the resin. As the combined sheet comes from the squeeze rollers 132 and 133 it is turned over and about so that the side which has the soluble coating comes into contact with the top of the core 120. At this point the structure is in the sandwich form.

Passing forwardly on the conveyor 116 and other suitable supporting structure, the side portions 140 of the upper resin impregnated sheet are turned down over the side edges of the core and into contact with the edge portions of the lower resin impregnated sheet to form the flanges 150. Thus formed, the composite structure passes into the oven 160 where heat is applied and the resin cured. After curing, the outer protective films may be stripped off and the finished panel utilized as before explained.

For purposes of further illustration I will set forth some specific examples of ways in which the invention may be practiced and specific products produced.

EXAMPLE 1

A mat of randomly oriented glass fibers, weighing 2 ounces per square foot, is passed through a resin bath at a rate of about 10 feet per minute. The resin is polyester resin, styrene monomer and methylmethacrylate monomer, in the proportions of about 3:1:1 respectively. This resin mixture is catalysed with benzoyl peroxide in an amount of about 1 to 2 percent by weight. The temperature of the bath is between 70 and 80° F. The mat then passes through a pair of squeeze rolls spaced about .07 inch apart while covered on top and bottom by protective films. The film passing around the lower roll and in contact with the bottom side of the resin impregnated mat, is regenerated cellulose. The film on the top side is polystyrene about .00075 inch thick.

After passing between the squeeze rolls the composite films rest on the conveyor which moves at the same rate. In this case there is visual evidence that the top film is beginning to dissolve about 30 seconds after it passes the squeeze rolls, and in about 1 minute the solution of the film is complete, leaving the resin saturated fiber glass mat laying on the film of regenerated cellulose fully saturated and free of entrapped air.

Elongated pieces of the sheet are cut and one piece is picked up by means of the cellulose film and laid on the female part of the mold. Then a core is placed on top of the sheet. In this case the core material is a kraft paper in honeycomb form which has been saturated with a phenolic resin to the extent of about 15% and cured to make the paper stiff and moisture resistant. The cell size of the core is ½ inch and it is 2 inches thick. End closure strips of aluminum channel 2 inches wide are placed on top of the sheet at the ends of the core.

A second face sheet is placed on the male part of the mold and clamped to it along the edges. This mold part is inverted and placed on top of the core and end closures. The hinged side rails of the mold are raised to bring the edge portions of the bottom sheet into vertical position in contact with the side edges of the core and into contact with the edges of the upper sheet, so as to compress the edges together to a thickness in this case of about ⅛ inch. The male section of the mold is forced downwardly by pressing to bring all parts of the faces into intimate contact with the core and to hold them there until curing takes place. The electrical resistance units in the mold are actuated to bring the temperature to about 150 to 250° F. In about 30 to 90 minutes the cure is complete and the panel is removed from the mold. The excess material in the flanges and extending beyond the end closures is removed by appropriate saws, and the panel is complete.

In this case the panel was 3 feet wide, 12 feet long and 2⅛ inches thick, with flanges extending 1 inch above the face.

When spanning 11 feet this panel will sustain live loads in excess of 50 pounds per square foot without excessive deflection.

EXAMPLE 2

In this case a sandwich panel was made according to the procedure outlined in Example 1. The glass mat weighed about 1 ounce per square foot and the squeeze roll setting was about .040 inch. The core was kraft paper honeycomb with a nominal cell size of ½ inch and was ½ inch thick. The end closure strips were wood, ½ inch square. The mold was used to produce a flange parallel to and flush with the top face. After cure was effected, the flanges were trimmed to ½ inch extension and the ends were trimmed flush with the closure strips. This panel is well suited for use as a light transmitting interior partition panel. It has superior stiffness quality and is light in weight.

EXAMPLE 3

In this case the face sheets are formed by passing two plies of glass fiber fabric through a resin bath of acrylic resin. The resin contained in addition to catalyst, pigment in the form of titanium dioxide to the extent of 5% by weight in the resin. The squeeze roll setting is .045 inch. The sheets are cut and assembled as in Example 1. The core in this case is rigid polyurethane foam with a density of 2½ pounds per cubic foot, and is three inches thick. The end closures were rectangular tubing 3 inches by 1 inch, with walls made from polyester resin and glass cloth. The pressure used on the mold in curing is 40 pounds per square foot, with the cure being completed in 2 hours at 140° F. The flange is trimmed to within ¼ inch of the face. The panel is 4 feet wide by 8 feet long. By reason of the excellent insulating qualities and structural strength imparted by this special construction, the panel is very well suited for use as a structural wall or ceiling panel for a refrigerated enclosure.

EXAMPLE 4

In this case the face sheets are formed by using woven glass fiber roving weighing 24 ounces per square yard. The resin bath is composed of epoxy resin, an amine hardener, and styrene oxide. The proportions are respectively 5:4:1 by weight. The squeeze rolls are gapped at .030 inch. The top film is polystyrene and the bottom film is .0005 inch thick Mylar. The core is what is commonly called "chip-board," which is made of wood chips and fibers compounded with resins and cured under heat and pressure to form a dense uniform board. In this case the flange is formed by the mold elements parallel to the faces and at the midpoint between them. The flange is also formed at the ends as well as at the sides of the panel. Cure pressure is 500 pounds per square foot and cure is complete in 1½ hours at 275° F. The completed panel shows low water absorption, superior impact and abrasion resistance, and improved stiffness due to the special sandwich construction. The panel is especially useful as decking or for facing concrete formwork.

EXAMPLE 5

A sheet formed as indicated by FIG. 1 and in accordance with the method of Example 1 (but with colored pigment added to the resin), is placed over a surface of corrugated sheet iron with the tacky side next to the iron and the regenerated cellulose sheet on the top side. The sheet is pressed toward the corrugated iron to get firm uniform contact and to remove any entrapped air, and then cured. After curing the regenerated cellulose film is removed leaving a durable attractive finish While this invention has been illustrated and described with respect to specific structures and various embodiments, those skilled in this art will appreciate that many changes may be made, and the structure and methods may take many forms, all within the spirit of the invention.

We claim:

1. A process for preparing a resin impregnated fibrous sheet comprising passing a fibrous sheet through a liquid thermosetting resin to impregnate it, placing over the surface of said fibrous sheet a self supporting thermoplastic film which is soluble in said resin, before said film has had time to dissolve in said resin passing said sheet and film between rolls to regulate the thickness thereof, permitting dissolution of said film after it has passed said rolls, and after said film has dissolved heating said sheet to cure said resin.

2. A process as in claim 1 in which the resin is a polyester.

3. A process as in claim 1 wherein the resin contains monomeric styrene and the film is polystyrene essentially.

4. A process for preparing a laminated structure comprising passing a glass fiber sheet through a bath of thermosetting resin, covering said sheet on one side with a preformed thermoplastic film which is soluble in said resin and on the other side with a preformed regenerated cellulose film, before the first said film has had time to dissolve in said resin passing the composite of said sheet and films between rolls to regulate the thickness thereof, and after a period during which said first mentioned film dissolves in said resin pressing said composite against the surface of a panel body with the resin side next to said body and said regenerated cellulose film on the exterior, heating the structure so formed to set said resin, and stripping said regenerated cellulose film from the structure.

5. A process for preparing a panel comprising impregnating a fibrous sheet with liquid thermosetting resin, covering said sheet on its top side with a protective self supporting thermoplastic film and on its bottom side with a protective self supporting film, the film on at least one of said sides being soluble in said resin, before the dissolution of said film has had time to take place passing said sheet and films through a pair of spaced rolls to regulate the thickness thereof, placing a core of relatively light weight material between pieces of the sheet so formed with the side to which said soluble film has been applied next to said core, and after said soluble film has become dissolved in said resin heating the structure to set said resin.

6. A process as in claim 5 in which said resin is a polyester containing monomeric styrene, said soluble film is a polymer of styrene or methylmethacrylate, and said core is paper containing air cells therein.

7. A process for preparing construction panels comprising impregnating a sheet of fibrous material with a liquid thermosetting resin, covering said sheet on both sides with a protective preformed thermoplastic film, the film on at least one side being soluble in said resin, before said soluble film has become dissolved in the resin pressing said sheets and films to regulate the thickness thereof, passing the pressed sheets forwardly on a conveyor, placing a preformed core layer against the side of the sheet coated with said soluble film, preparing a second sheet by the same steps as above given for the preparation of said first mentioned sheet, placing said second sheet over said core, bringing the side edges of said sheets together over the ends of said core with the sides which were covered with the soluble film in contact with each other, and heating said structure to set said resin.

References Cited

UNITED STATES PATENTS

| | | | |
|---|---|---|---|
| 2,335,220 | 11/1943 | Edwards | 161—99 XR |
| 2,496,911 | 2/1950 | Green | 156—323 |
| 2,528,152 | 10/1950 | Landgraf | 156—323 |
| 2,628,180 | 2/1953 | Iverson | 156—334 |
| 2,873,226 | 2/1959 | Davies et al. | 156—332 |
| 2,765,250 | 10/1956 | Williams | 156—309 |
| 2,784,763 | 3/1957 | Shorts | 156—201 |
| 3,256,133 | 6/1966 | Wright et al. | 161—160 |
| 3,272,645 | 9/1966 | Duhoo et al. | 156—289 |

OTHER REFERENCES

Ellis, Carleton: Chemistry of Synthetic Resins, vol. I, Rheinhold, N.Y. (1935), p. 885 relied on.

Neumann, J. Alex.: Welding of Plastics, Rheinhold, N.Y. (1959), pp. 110 and 111.

HAROLD ANSHER, Primary Examiner

W. E. HOAG, Assistant Examiner

U.S. Cl. X.R.

156—247, 289; 264—134, 257